(12) United States Patent
Kumahashi

(10) Patent No.: US 12,432,306 B2
(45) Date of Patent: Sep. 30, 2025

(54) STORAGE MEDIUM, CONTROL METHOD FOR TERMINAL APPARATUS, AND TERMINAL APPARATUS

(71) Applicant: CANON KABUSHIKI KAISHA, Tokyo (JP)

(72) Inventor: Shu Kumahashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/410,763

(22) Filed: Jan. 11, 2024

(65) Prior Publication Data
US 2024/0244147 A1 Jul. 18, 2024

(30) Foreign Application Priority Data

Jan. 17, 2023 (JP) ................. 2023-004841

(51) Int. Cl.
*H04N 1/00* (2006.01)
(52) U.S. Cl.
CPC ....... *H04N 1/00464* (2013.01); *H04N 1/0048* (2013.01)
(58) Field of Classification Search
None
See application file for complete search history.

(56) References Cited

U.S. PATENT DOCUMENTS

| 8,755,077 B2* | 6/2014 | Nakajima | H04N 1/00222 |
| | | | 358/1.15 |
| 2015/0156354 A1* | 6/2015 | Yamamoto | H04N 1/00408 |
| | | | 358/1.15 |

FOREIGN PATENT DOCUMENTS

JP 2018174367 A 11/2018

* cited by examiner

*Primary Examiner* — Dov Popovici
(74) *Attorney, Agent, or Firm* — Canon U.S.A., Inc. IP Division

(57) ABSTRACT

A non-transitory computer-readable storage medium stores a program for causing a terminal apparatus to communicate with an information processing apparatus to execute a method that includes receiving a first setting of the information processing apparatus, and displaying an object for accessing a web page for configuring a second setting of the information processing apparatus via a web browser, wherein, in the displaying, guide information about a warning displayed on the web browser is displayed by accessing the web page via the web browser.

13 Claims, 18 Drawing Sheets

FIG.8

| BROWSER TYPE | GUIDELINE IMAGE | OS STANDARD FLAG |
|---|---|---|
| BROWSER A | IMAGE A | TRUE |
| BROWSER B | IMAGE B | FALSE |
| BROWSER C | IMAGE C | FALSE |

STORAGE MEDIUM, CONTROL METHOD FOR TERMINAL APPARATUS, AND TERMINAL APPARATUS

BACKGROUND

Field

The present disclosure relates to a storage medium, a control method for a terminal apparatus, and a terminal apparatus.

Description of the Related Art

Japanese Patent Application Laid-Open No. 2018-174367 discusses an application to be installed on a personal computer (PC) and executed to facilitate configuration of network settings for a multi-function peripheral (MFP).

After configuring the network settings for an information processing apparatus, such as an MFP, using the application discussed in Japanese Patent Application Laid-Open No. 2018-174367, a user needs to configure a number of advanced settings, including electronic mail (e-mail) transmission and reception settings for the MFP, facsimile (fax) transmission and reception settings, and printing settings. To configure the advanced settings, settings can be received on a setting screen displayed by accessing a web page provided by the MFP serving as a web server via a PC. For the user to easily access the web page, a Uniform Resource Locator (URL) for accessing the web page, or an object for accessing the URL can be displayed on the application discussed in Japanese Patent Application Laid-Open No. 2018-174367.

There is a possibility that personal information, such as an e-mail address, is handled in the advanced settings on the web page. Accordingly, it is desirable that communication between a browser on the PC and the web server of the MFP be performed using Hyper Text Transfer Protocol Secure (HTTPS) communication. In the HTTPS communication, a public-key certificate held in the web server is transmitted to the browser, and a client verifies the validity of the certificate to start the communication. A certificate signed by a third party is generally used as the certificate held in the web server. However, from a cost perspective, a self-signed certificate is incorporated into an MFP before shipment in many cases. Thus, when the user accesses the web page of the MFP, the browser displays a warning concerning the certificate. When the user accesses the web page of the MFP via the above-described application to configure the advanced settings, a warning may be displayed although there is no adverse effect due to the self-signed certificate, so that the user may not know how to access the web page.

The present disclosure has been made in view of the above-described issue, and is directed to enabling a user to grasp how to access a web page even in a case where a warning is displayed when the user accesses the web page for configuring settings for an information processing apparatus from an application for configuring the settings for the information processing apparatus.

SUMMARY

According to an aspect of the present disclosure, a storage medium stores a program for causing a terminal apparatus to communicate with an information processing apparatus to execute a method that includes receiving a first setting of the information processing apparatus, and displaying an object for accessing a web page for configuring a second setting of the information processing apparatus via a web browser, wherein, in the displaying, guide information about a warning displayed on the web browser is displayed by accessing the web page via the web browser.

Further features of the present disclosure will become apparent from the following description of exemplary embodiments with reference to the attached drawings.

BRIEF DESCRIPTION OF THE DRAWINGS

FIG. 8 is a diagram illustrating an example of a guideline image table stored in a hard disc drive (HDD) by the setup application.

DESCRIPTION OF THE EMBODIMENTS

Exemplary embodiments for carrying out the present disclosure will be described below with reference to the drawings. Configurations described in the following exemplary embodiments are merely examples, and the present disclosure is not limited to the illustrated configurations.

Figure 1:
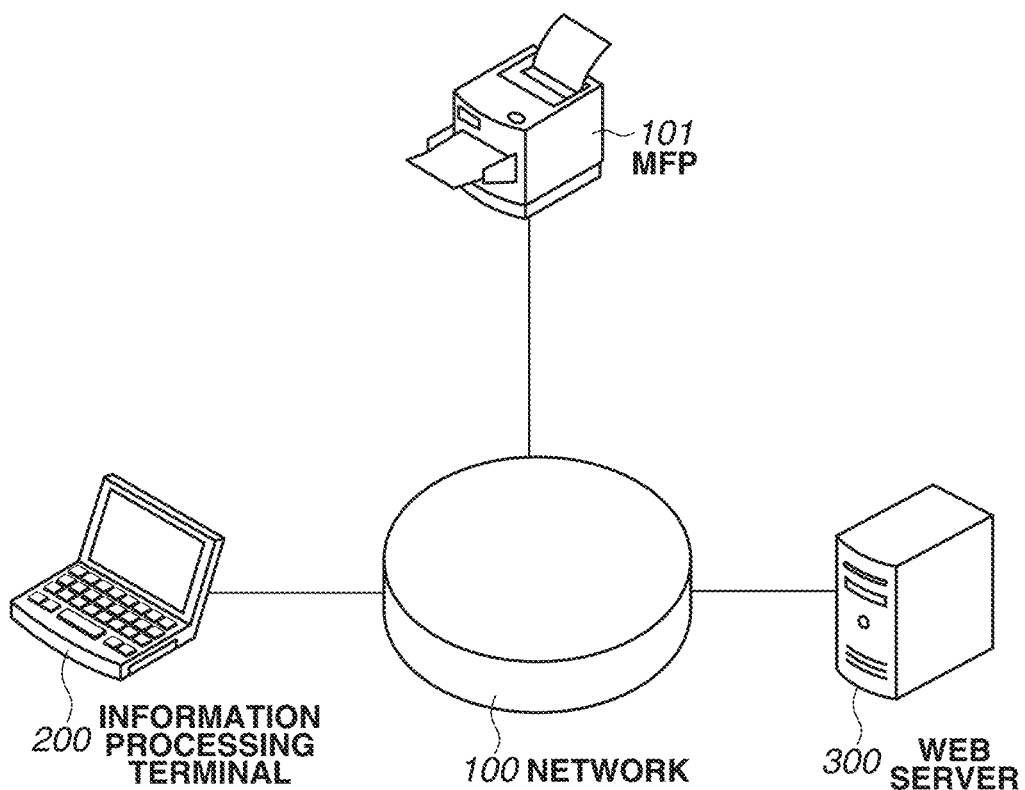
FIG. 1 is a diagram illustrating an example of a configuration of a system according to a first exemplary embodiment of the present disclosure.

FIG. 1 is a diagram illustrating an example of a configuration of a system according to a first exemplary embodiment of the present disclosure. The system according to the present exemplary embodiment includes a multi-function peripheral (MFP) 101, which is an example of an information processing apparatus or an image processing apparatus, an information processing terminal 200, which is an example of a terminal apparatus, and a web server 300. The information processing terminal 200, the MFP 101, and the web server 300 can communicate with each other via a network 100. The web server 300 provides a web page that can be accessed from a browser. The MFP 101 also has a web server function. An application for configuring settings for the MFP 101 is installed on the information processing terminal 200. The network 100 according to the present exemplary embodiment may be the Internet or a local area network (LAN). The network 100 may be a wired or wireless network.

Figure 2:
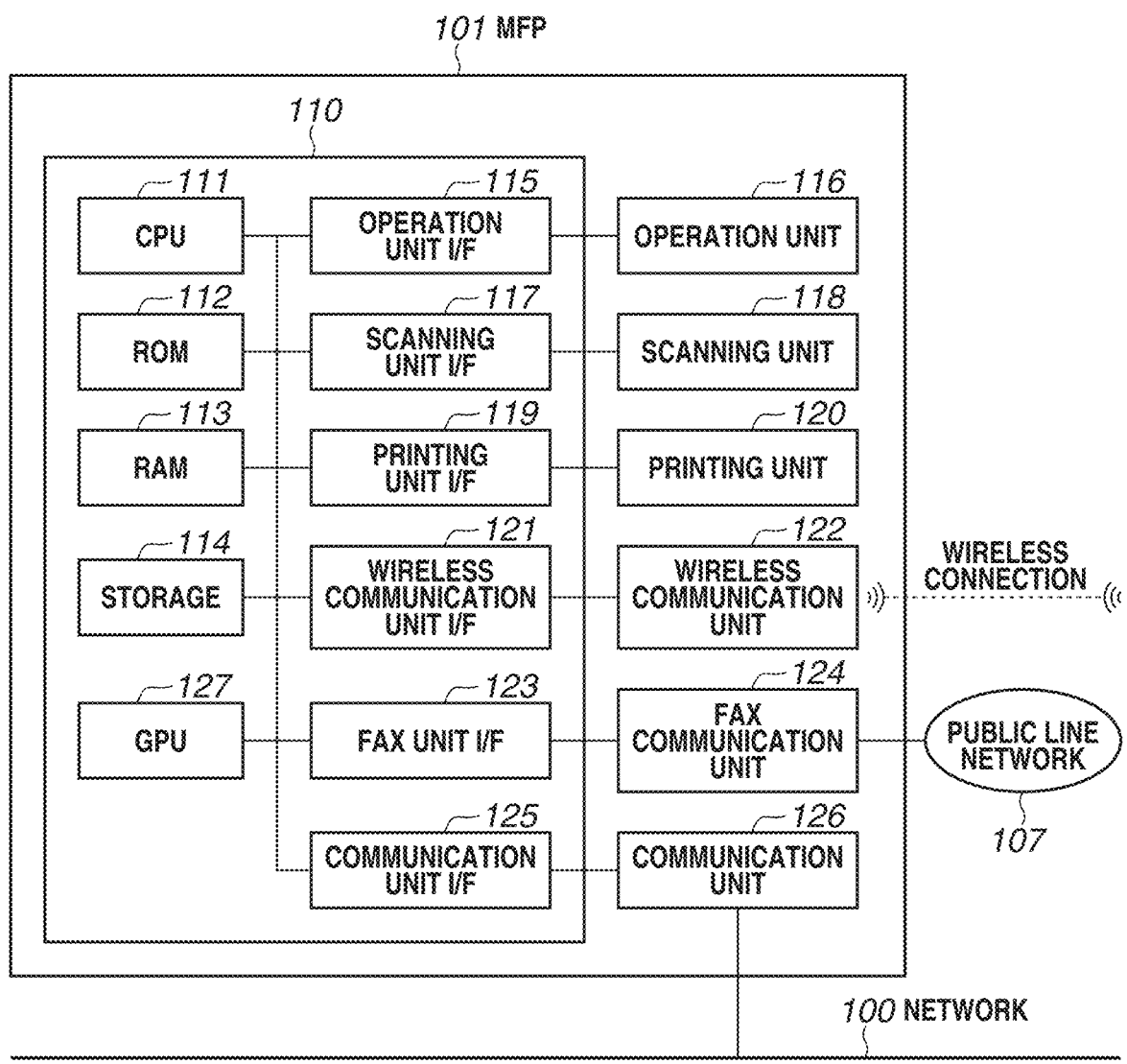
FIG. 2 is a block diagram illustrating an example of a hardware configuration of a multi-function peripheral (MFP).

FIG. 2 is a block diagram illustrating an example of a hardware configuration of the MFP 101. The MFP 101 includes a central processing unit (CPU) 111, a read-only memory (ROM) 112, a random access memory (RAM) 113, a storage 114, an operation unit interface (I/F) 115, an operation unit 116, a scanning unit I/F 117, a scanning unit 118, a printing unit I/F 119, a printing unit 120, a wireless communication unit I/F 121, and a wireless communication unit 122. The MFP 101 also includes a facsimile (fax) unit I/F 123, a fax communication unit 124, a communication unit I/F 125, and a communication unit 126.

A control unit 110 including the CPU 111 controls operation of the entire MFP 101. The CPU 111 loads a control program stored in the ROM 112 or the storage 114 into the RAM 113, thereby performing various kinds of control, such as scanning control and printing control. The ROM 112 stores control programs that can be executed by the CPU 111. The ROM 112 also stores a boot program, font data, and the like. The RAM 113 is a main storage memory and is used as a work area or a temporary storage area for loading various control programs stored in the ROM 112 and the storage 114. The storage 114 stores image data, print data, various programs, and various kinds of setting information. It is assumed that a flash memory is used as the storage 114 in the present exemplary embodiment. Alternatively, an auxiliary storage device, such as a solid-state drive (SSD) or a hard disc drive (HDD), may be used. An embedded MultiMediaCard (eMMC) may also be used.

The MFP 101 according to the present exemplary embodiment executes each process in flowcharts to be described below by one CPU 111 using one memory (RAM 113), but is not limited to this configuration. For example, each process in the flowcharts to be described below can also be executed by, for example, causing a plurality of CPUs, RAMs, ROMs, and storages to operate in cooperation. Some processes may be executed using a hardware circuit, such as an application-specific integrated circuit (ASIC) or a field-programmable gate array (FPGA).

The operation unit I/F 115 connects the operation unit 116, including a display unit such as a touch panel and hardware keys, and the control unit 110 to each other. The operation unit 116 displays information for a user and detects an input from the user.

The scanning unit I/F 117 connects the scanning unit 118, such as a scanner, and the control unit 110 to each other. The scanning unit 118 scans an image on a document, and the CPU 111 converts the image into image data, such as binary data. The image data generated based on the image scanned by the scanning unit 118 is transmitted to an external apparatus or is printed on a recording sheet.

The printing unit I/F 119 connects the printing unit 120, such as a printer, and the control unit 110 to each other. The CPU 111 transfers image data (print data) stored in the RAM 113 to the printing unit 120 via the printing unit I/F 119. The printing unit 120 prints an image based on the transferred image data on a recording sheet fed from a feeding cassette.

The wireless communication unit I/F 121 is an I/F for controlling the wireless communication unit 122, and connects the control unit 110 to an external wireless apparatus via a wireless connection.

The control unit 110 controls the fax communication unit 124, such as a fax machine, via the fax unit I/F 123 to thereby connect to a public line network 107. The fax unit I/F 123 is an I/F for controlling the fax communication unit 124, and controls a modem or a network control unit (NCU) for fax communication to thereby make it possible to control the connection to the public line network 107, facsimile communication, and the like.

The communication unit I/F 125 connects the control unit 110 and the communication unit 126 to each other. The communication unit I/F 125 enables the communication unit 126 to transmit image data and various kinds of information in the MFP 101 to an external apparatus on the network 100, and to receive print data and information on the network 100 from an information processing apparatus on the network 100. Examples of the method for transmitting and receiving data and information via the network 100 include a method of transmitting and receiving data and information using an electronic mail (e-mail), and a method of transmitting a file using another protocol (e.g., File Transfer Protocol (FTP), Server Message Block (SMB), or Web Distributed Authoring and Versioning (WebDAV)). Further, image data and various kinds of setting data can be transmitted and received via the network 100 by accessing from the information processing terminal 200 using a Hyper Text Transfer Protocol (HTTP) communication or a Hyper Text Transfer Protocol Secure (HTTPS) communication.

Figure 3:
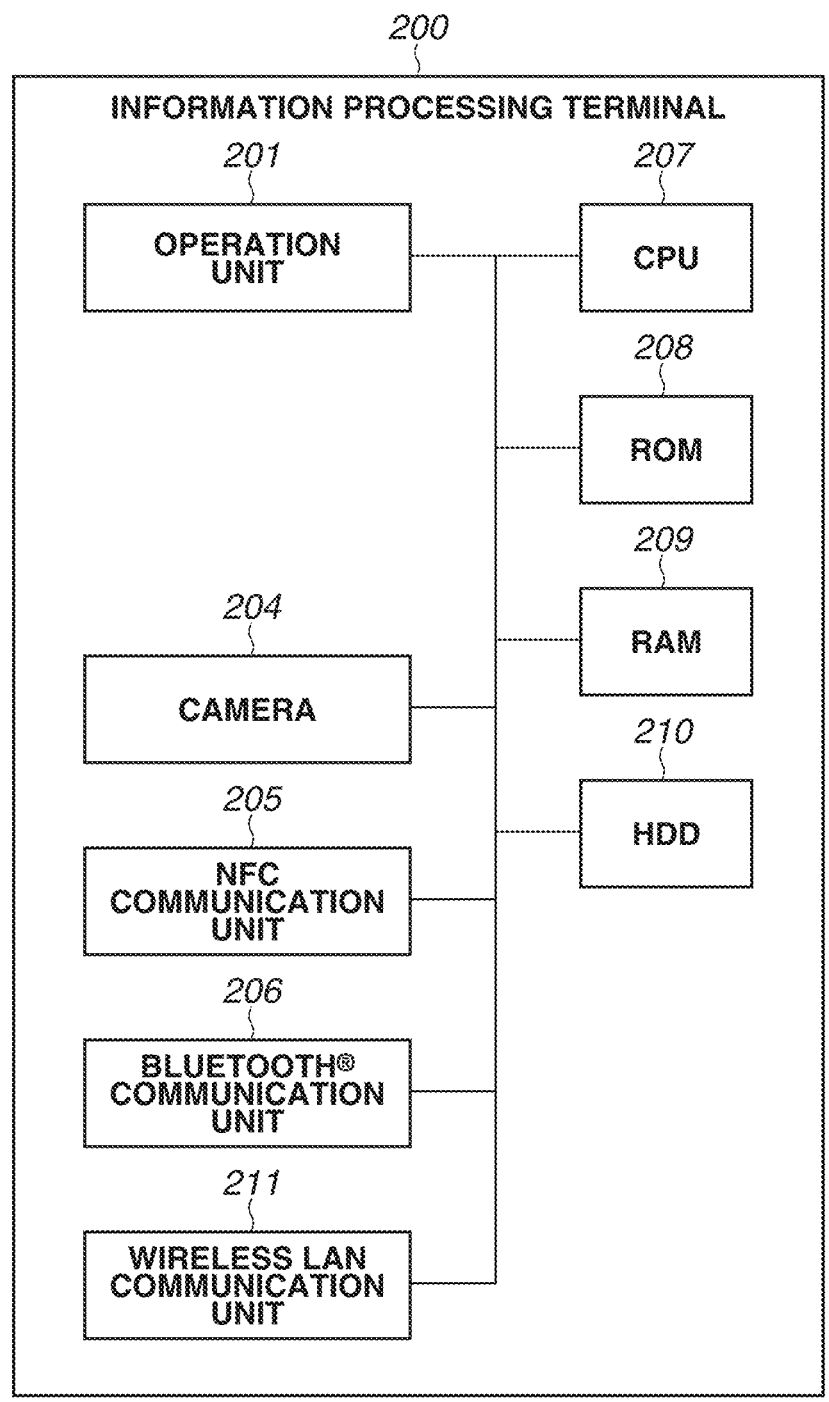
FIG. 3 is a block diagram illustrating an example of a hardware configuration of an information processing terminal.

FIG. 3 is a block diagram illustrating an example of a hardware configuration of the information processing terminal 200. It is assumed that a smartphone, a tablet personal computer (PC), or the like is used as the information processing terminal 200 according to the present exemplary embodiment. However, any other apparatus may be used as the information processing terminal 200 as long as the apparatus is a terminal apparatus capable of communicating with the MFP 101.

A CPU 207 loads a control program stored in a ROM 208 and executes various processes for controlling operation of the information processing terminal 200. The ROM 208 stores control programs. A RAM 209 is a main memory and is used as a temporary storage area, such as a work area, for the CPU 207. An HDD 210 stores various data on pictures, electronic documents, and the like.

An operation unit 201 includes a touch panel function capable of detecting a touch operation by the user, and displays various screens provided by an operating system (OS) and an e-mail transmission application. The operation unit 201 is used to execute a setup application 403 for the MFP 101. The user inputs a touch operation on the operation unit 201, thereby making it possible to input a desired operation instruction to the information processing terminal 200. The information processing terminal 200 includes hardware keys (not illustrated), which enable the user to input the operation instruction to the information processing terminal 200 using these hardware keys. Alternatively, the information processing terminal 200 may receive an operation input via a mouse, a keyboard, or the like.

A camera 204 captures images in response to an image capturing instruction from the user. Pictures captured by the camera 204 are stored in a predetermined area of the HDD 210. In addition, information can be acquired from a QR code® read by the camera 204 using a program capable of analyzing the QR code®.

The information processing terminal 200 is configured to exchange data with various peripheral devices via a near-field communication (NFC) communication unit 205, a Bluetooth® communication unit 206, and a wireless LAN communication unit 211. The Bluetooth® communication unit 206 in the information processing terminal 200 may support Bluetooth® Low Energy.

The setup application 403 for the MFP 101 is installed in a predetermined area of the HDD 210, loaded into the RAM 209, and executed by the user via the operation unit 201.

Figure 4:
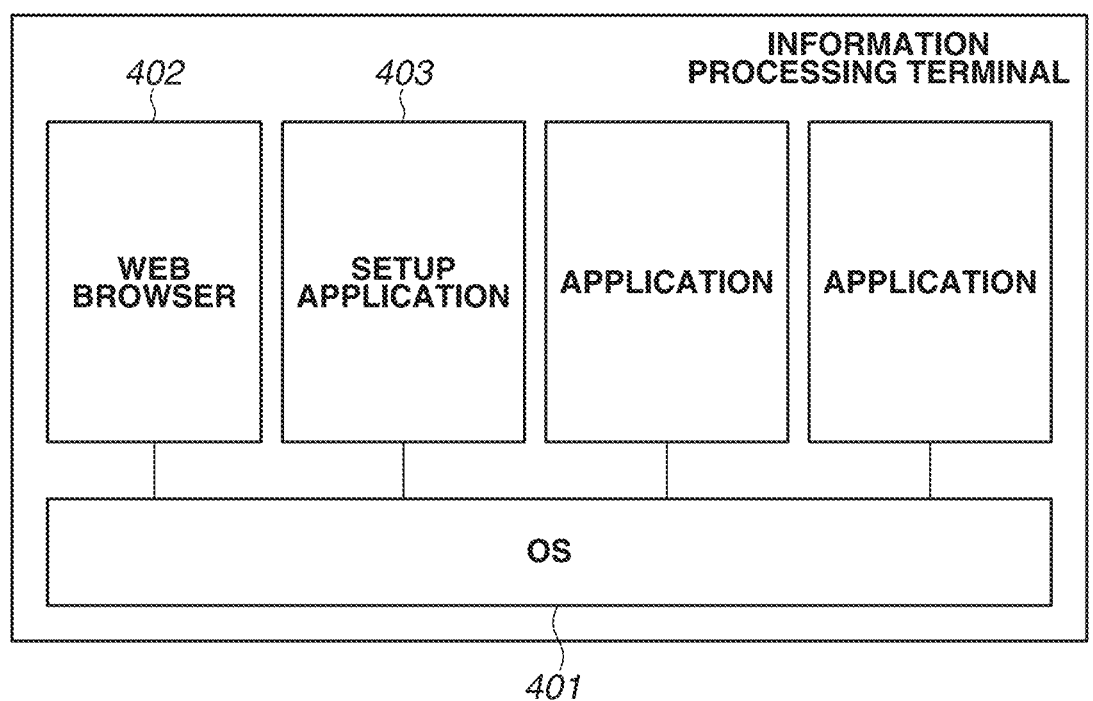
FIG. 4 is a block diagram illustrating an example of a software configuration of the information processing terminal.

FIG. 4 is a block diagram illustrating an example of a software configuration of the information processing terminal 200. An OS 401 is an operating system for the information processing terminal 200. An application installed on the information processing terminal 200 provides an interface for using hardware of the information processing terminal 200.

A web browser 402 is a web browser for accessing a web service on an external apparatus.

The setup application 403 is an application to be run on the information processing terminal 200 to remotely perform setup of the MFP 101. A notification about a Uniform Resource Locator (URL) for a web service for the MFP 101 is transmitted to the web browser 402 via the OS 401, thereby the web browser 402 for displaying a web page provided by a web server of the MFP 101 can be started up.

Figure 5:
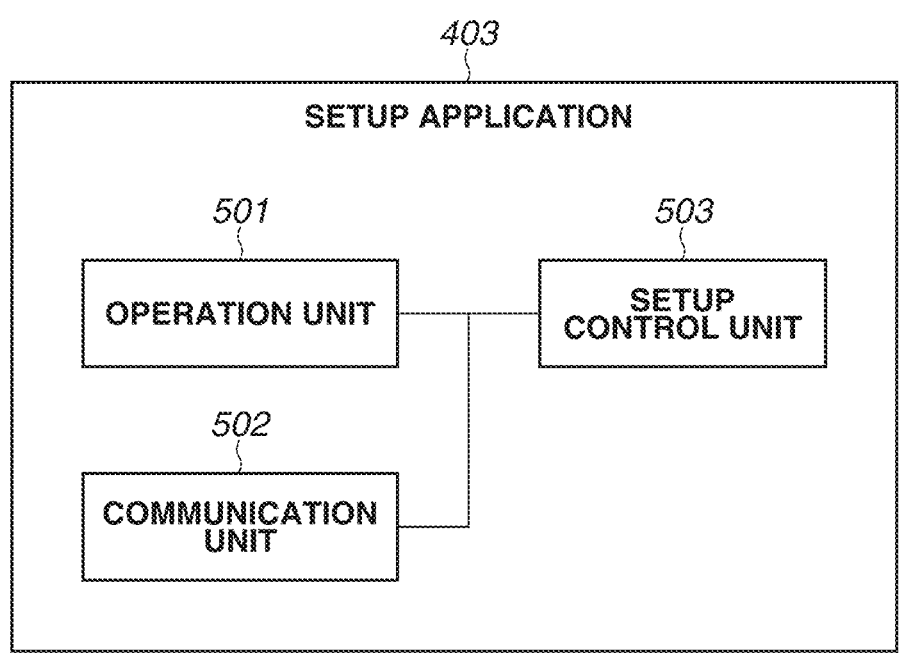
FIG. 5 is a block diagram illustrating an example of a software configuration of a setup application to be run on the information processing terminal.

FIG. 5 is a block diagram illustrating an example of a software configuration of the setup application 403 to be run on the information processing terminal 200.

An operation unit 501 displays an operation screen for the setup application 403 on the operation unit 201 via the OS 401.

A communication unit 502 performs communication with the MFP 101 and an external apparatus connected via another network using the NFC communication unit 205, the Bluetooth® communication unit 206, and the wireless LAN communication unit 211 via the OS 401.

A setup control unit 503 controls the entire setup to be performed on the MFP 101 via the OS 401, the operation unit 501, and the communication unit 502. Specifically, the setup control unit 503 performs communication with the MFP 101, transmits a start-up instruction to the web browser 402, and displays a screen depending on a progress status of the setup.

In a case where the user is to be prompted access to a web page for configuring advanced settings of the MFP 101 in the setup application 403 as described above, a warning concerning a certificate of the web server may be displayed. In this case, there is a possibility that the user does not know how to deal with the warning, or does not know how to access the web page when the warning is displayed. To solve such an issue, the information processing terminal 200 executes the following processing.

Figure 6:
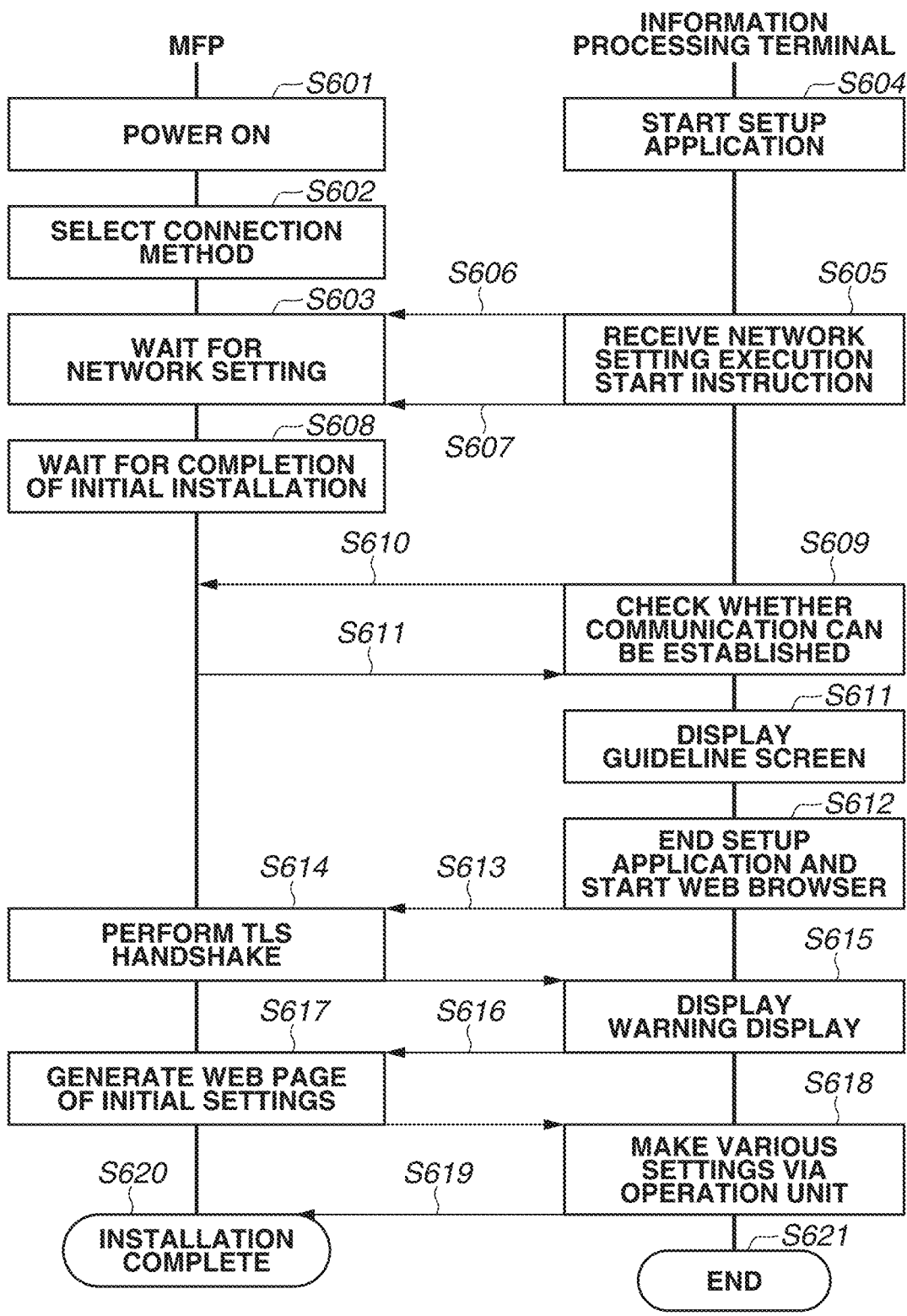
FIG. 6 is a sequence diagram illustrating an example of a sequence of configuring initial settings of the MFP using the setup application installed on the information processing terminal.

FIG. 6 is a sequence diagram illustrating an example of a sequence for configuring initial settings of the MFP 101 using the setup application 403 installed on the information processing terminal 200.

In step S601, the MFP 101 is powered on and started. In step S602, the MFP 101 displays a connection method selection screen on the operation unit 201, and receives a selected connection method. Upon receiving the selected connection method, in step S603, the MFP 101 enters a network setting standby state.

In step S604, the information processing terminal 200 starts the setup application 403 by a user operation. In step S605, the information processing terminal 200 receives, from the user, an instruction for starting execution of the network setting which is a first setting of the MFP 101 via the operation unit 201.

In step S606, the information processing terminal 200 searches for the MFP 101 that is in the network setting standby state, starts the network setting, and transmits a setting value input to the setup application 403 and a selected setting value to the MFP 101 to configure the setting.

In step S607, the information processing terminal 200 transmits a network setting completion instruction to the MFP 101. Upon receipt of the instruction, the MFP 101 transitions to a normal state from the network setting standby state. The network setting completion instruction may be transmitted when receiving of all network settings is completed, or may be transmitted when a completion operation is received from the user using the setup application 403.

When the MFP 101 receives the network setting completion instruction, in step S608, the MFP 101 transitions to an initial installation completion standby state.

In step S609, the information processing terminal 200 starts checking processing, on the MFP 101, to check whether the information processing terminal 200 and the MFP 101 can communicate with each other using the configured network setting.

In step S610, the information processing terminal 200 checks whether the MFP 101 is connected to the network 100 using a command, such as a ping. The MFP 101 returns a response to a network connection check from the information processing terminal 200.

Figure 10:
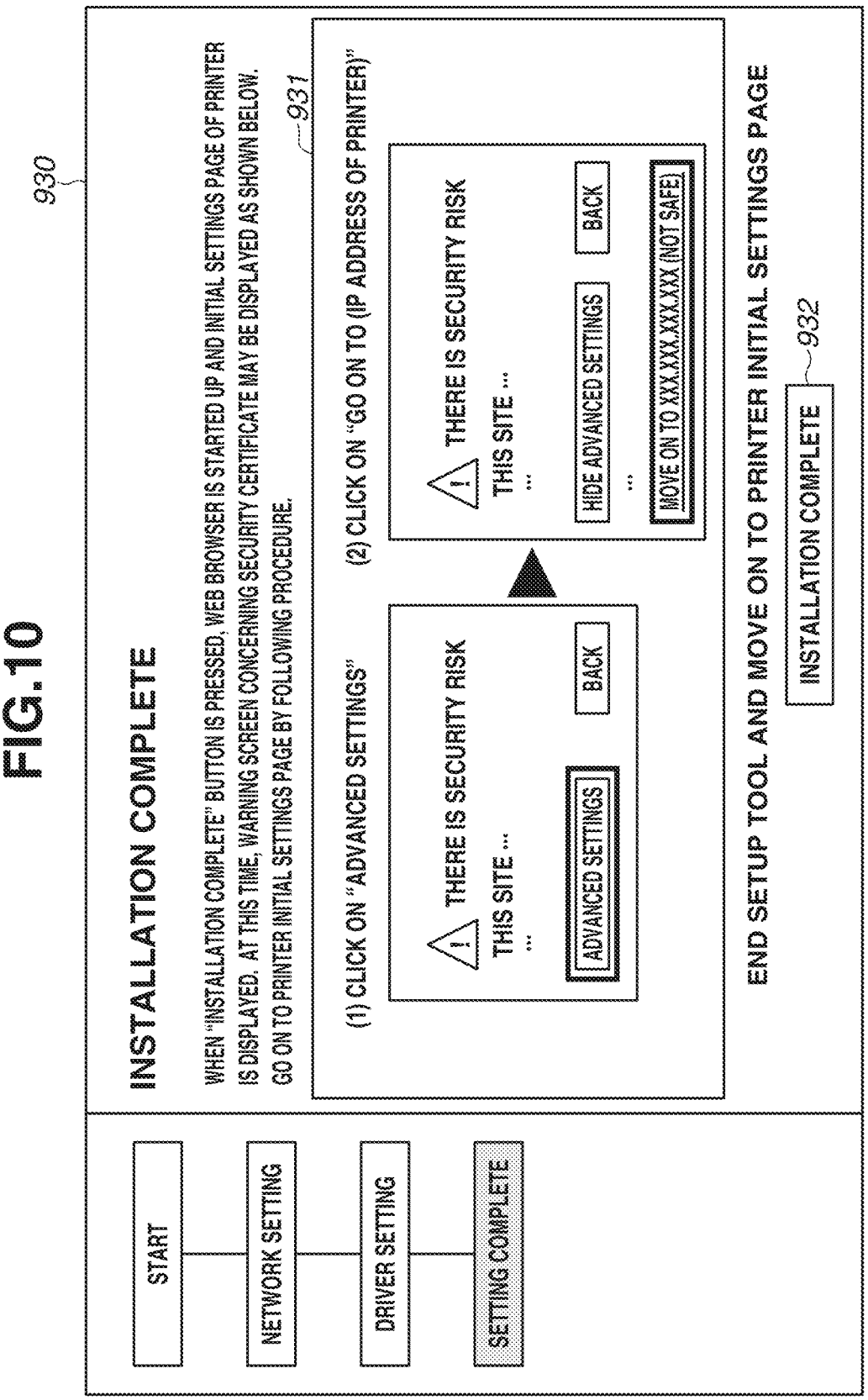
FIG. 10 is a diagram illustrating an example of a guideline screen of the setup application.

In step S611, the information processing terminal 200 displays a screen (FIG. 10) containing information indicating that a warning screen concerning a certificate is to be displayed when the web browser 402 is started in step S612 to display a web page of the MFP 101, and guide information indicating a method for dealing with a warning. FIG. 10 will be described below. The warning concerning the certificate is a warning concerning a certificate held in the web server of the MFP 101.

Upon receiving a predetermined operation on the screen displayed in step S611, in step S612, the information processing terminal 200 ends the setup application 403 and starts the web browser 402. In this case, the web browser 402 is started while being instructed to make a request for acquiring the web page of the MFP 101. The predetermined operation may be an operation for selecting an object or a link displayed on the screen, or may be an operation indicating a setting end.

In step S613, the information processing terminal 200 starts transport layer security (TLS) communication with the MFP 101 as pre-processing for acquiring the web page. The processing is to be performed when the web browser 402 accesses the web server using HTTPS communication. If the web browser 402 accesses the web server by HTTP communication, processing of steps S613 to S616 is skipped.

In step S614, the MFP 101 performs a TLS handshake for TLS communication with the information processing terminal 200. A server certificate held in the web server of the MFP 101 is transmitted to the information processing terminal 200 during the TLS handshake.

In step S615, the web browser 402 of the information processing terminal 200 determines whether the server certificate received from the MFP 101 satisfies a predetermined condition. In a case where the server certificate satisfies the predetermined condition, the warning screen concerning the certificate is displayed on the web browser 402. Examples of the case where the predetermined condition is satisfied include a case where the certificate received from the MFP 101 is a self-signed certificate, a case where the certificate is expired, and a case where a common name in the certificate is different from a web page URL. Then, the user closes the warning screen and issues an instruction to go on to the web page of the MFP 101 via the operation unit 201.

In step S616, the information processing terminal 200 makes a web page acquisition request for the MFP 101 again.

In step S617, the MFP 101 generates a web page for initial settings, and transmits the generated web page to the information processing terminal 200 by HTTP communication. The web page includes Hyper Text Markup Language (HTML), Cascading Style Sheets (CSS), JavaScript, and an image file.

Figure 12:
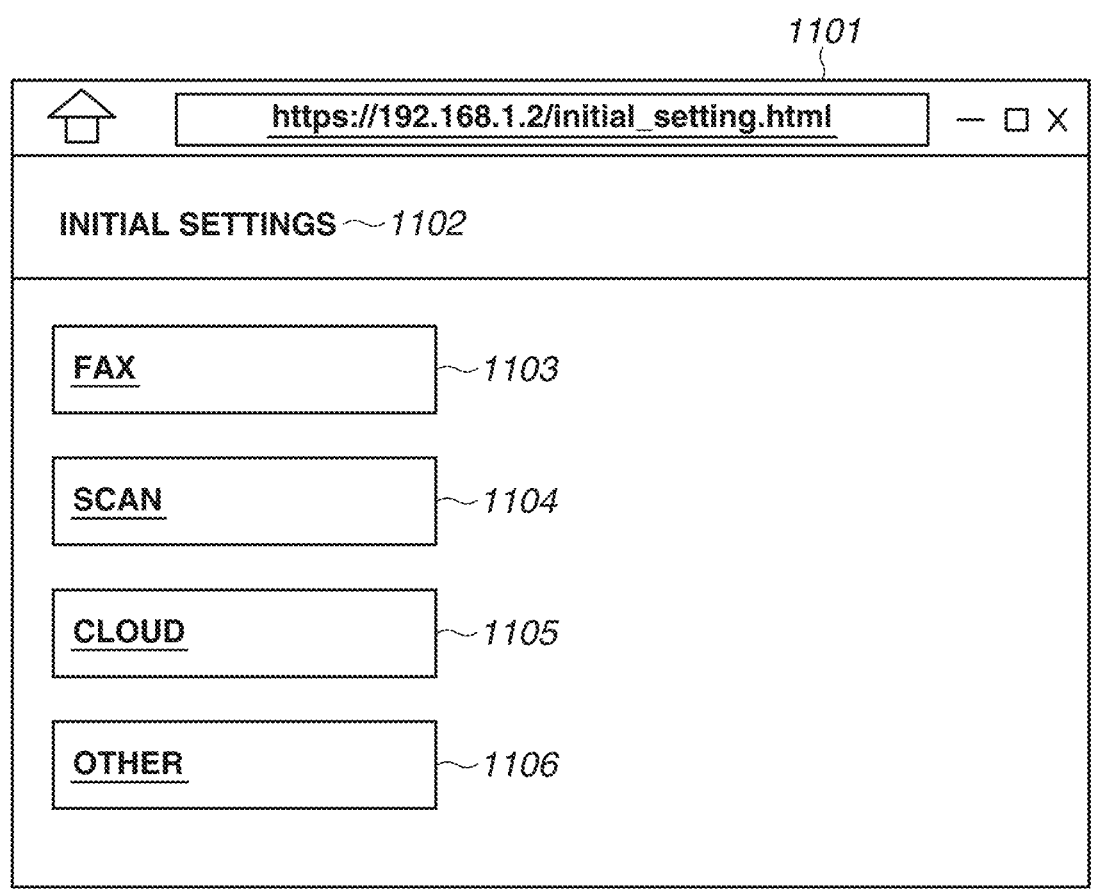
FIG. 12 is a diagram illustrating an example of a web page screen for initial installation provided by the MFP and is displayed on an operation unit of the information processing terminal.

In step S618, the information processing terminal 200 displays the web page received from the MFP 101 on the operation unit 201 using a web browser (FIG. 12). The user configures various settings of the MFP 101 via the operation unit 201. Various settings of the MFP 101 correspond to a second setting of the MFP 101, and are advanced settings including e-mail transmission and reception settings, fax transmission and reception settings, printing function settings, and authentication settings. When the user selects an end button via the operation unit 201, in step S619, the information processing terminal 200 transmits information indicating that the initial settings are complete to the MFP 101.

In step S620, the MFP 101 records information indicating that the installation is complete on the storage 114.

Accordingly, at the next power-on, normal start-up processing, which is different from the initial installation procedure, is performed. The initial installation completion standby state of the MFP 101 may transition to a completion state with time if no instruction is provided by the user. In step S621, the information processing terminal 200 ends the web browser 402.

Figure 7:
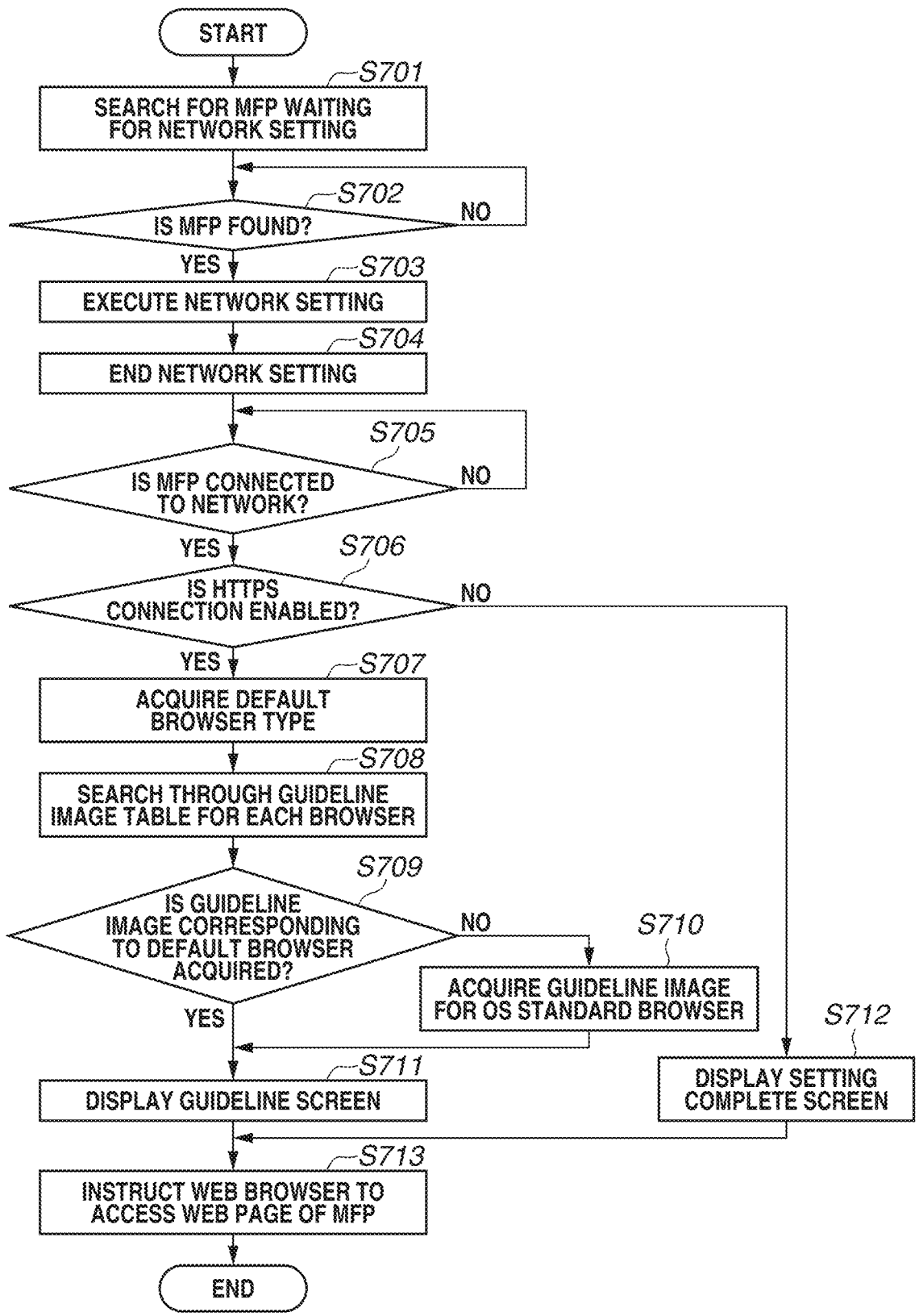
FIG. 7 is a flowchart illustrating an example of processing for executing the setup application to be executed by the information processing terminal.

FIG. 7 is a flowchart illustrating an example of processing for executing the setup application 403 to be executed by the information processing terminal 200. The CPU 207 loads a program stored in the ROM 208 into the RAM 209, and executes the program to thereby execute processing in the flowchart of FIG. 7.

In step S701, the setup application 403 searches for the MFP 101 waiting for network setting.

In step S702, if the setup application 403 finds an MFP 101 waiting for network setting (YES in step S702), the processing proceeds to step S703. If the setup application 403 does not find the MFP 101 waiting for network setting (NO in step S702), the setup application 403 continues to be in the standby state in step S702.

In step S703, the setup application 403 transmits a setting value for the network setting received from the user to the MFP 101, and causes the MFP 101 to set the setting value. Examples of the setting value for the network setting include setting values (connection information) for an Internet Protocol (IP) address of the MFP 101, a subnet mask, and a default gateway. To establish a wireless connection with the MFP 101, setting values of a service set identifier (SSID) and a password for an access point (AP) to which the MFP 101 is connected may be used.

In step S704, the setup application 403 transmits a network setting end notification to the MFP 101. In this case, address information, such as the IP address, about the MFP 101 is determined.

In step S705, the setup application 403 confirms whether the MFP 101 is connected to the network 100. If the setup application 403 receives a network response (YES in step S705), the processing proceeds to step S706. If the setup application 403 does not receive any network response (NO in step S705), the setup application 403 continues to be in the standby state in step S705.

In step S706, the setup application 403 determines whether a setting for using HTTPS communication in accessing the web page is enabled. If the setting is enabled (YES in step S706), the processing proceeds to step S707. If the setting is not enabled (NO in step S707), the processing proceeds to step S712.

In step S707, the setup application 403 acquires information indicating the type of default browser from the OS 401. An OS standard browser is generally pre-installed on an information processing terminal provided with a web browser. Some users may install an optional browser and set the installed browser as the default browser.

In step S708, the setup application 403 attempts to acquire a guideline image corresponding to the default browser. In general, a caption on a warning screen concerning a certificate and a method for dealing with a warning slightly vary depending on the type of browser. Accordingly, a guideline image suitable for each type of browser is used to present an appropriate method for dealing with the warning to the user. The setup application 403 stores a table including pairs of an optional browser and a guideline image for the browser as illustrated in FIG. 8 in the HDD 210. The guideline image corresponding to the default browser acquired in step S707 is acquired by searching through the table. Further, based on the default browser, not only the guideline image, but also a message indicating a method for dealing with the warning is acquired, and the guideline image and the message are displayed in accordance with the browser.

In step S709, the setup application 403 determines whether the guideline image corresponding to the browser identified in step S707 is acquired. Since there are various types of browsers, depending on the default browser of the user, the guideline image may not exist in the guideline image table. If the guideline image corresponding to the browser is acquired (YES in step S709), the processing proceeds to step S711. If the guideline image corresponding to the browser is not acquired (NO in step S709), the processing proceeds to step S710.

In step S710, the setup application 403 acquires the guideline image corresponding to the OS standard browser and a message indicating a method for dealing with a warning. As described above, a standard browser is pre-installed on the OS, and the guideline image table includes a flag indicating the OS standard browser as illustrated in FIG. 8. If the guideline image for the user's default browser does not exist in the guideline image table, the guideline image for the OS standard browser is used instead of the guideline image for the user's default browser. Alternatively, a configuration in which only the guideline image for the OS standard browser is held and the guideline image table is not held can also be employed. In such a configuration, steps S707 to S709 are skipped, and the guideline image for the OS standard browser is constantly acquired. Thus, the setup application 403 can determine the guide information to display based on the browser (default browser) used by the information processing terminal 200 to display the web page.

In step S711, the setup application 403 displays a guideline screen illustrated in FIG. 10 and displays the guide information on the operation unit 201. When the user presses an installation complete button 932, the processing proceeds to step S713. The guide information will be described in detail with reference to FIG. 10.

In step S712, the setup application 403 need not display the guideline screen since the setup application 403 is configured not to perform the HTTPS communication with the MFP 101. Accordingly, a setting complete screen 940 illustrated in FIG. 9D is displayed. When the user presses an installation complete button 942, the processing proceeds to step S713.

In step S713, the setup application 403 instructs the web browser 402 to access the web page of the MFP 101 via the OS 401 in response to the user pressing the installation complete button 932 or 942. A URL for the web page includes the IP address of the MFP 101 determined in step S704. For example, when the IP address of the MFP 101 is "192.168.1.100", a URL is "https://192.168.1.100". If the processing proceeds to step S713 from step S712, a URL "http://192.168.1.100" is displayed.

FIGS. 9A to 9D are diagrams illustrating examples of a setting screen of the setup application 403.

Figure 9A:
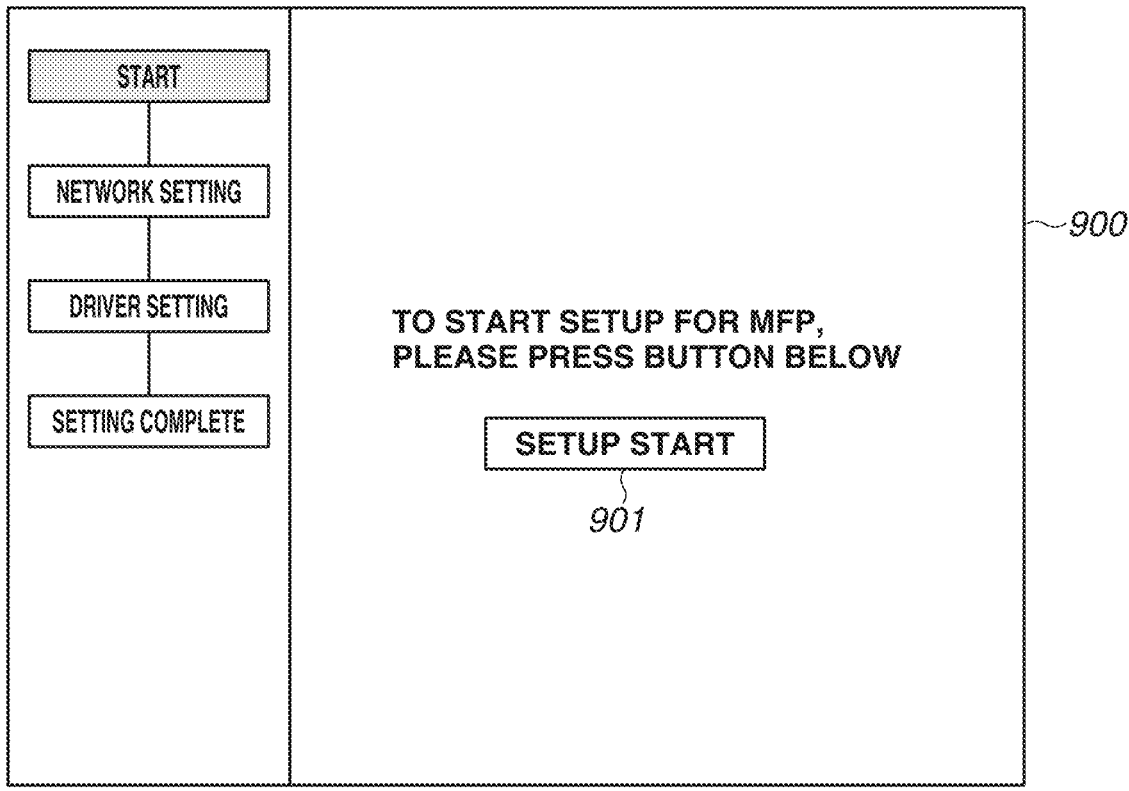
FIGS. 9A, 9B, 9C, and 9D are diagrams illustrating examples of a setting screen of the setup application.

A start screen 900 illustrated in FIG. 9A is a screen to be displayed on the operation unit 201 when the CPU 207 of the information processing terminal 200 starts the setup application 403.

FIG. 9A illustrates an example of the start screen 900 of the setup application 403.

A start button 901 is displayed on the start screen 900. When the start button 901 is selected, setup (initial settings) processing is started.

Figure 9B:
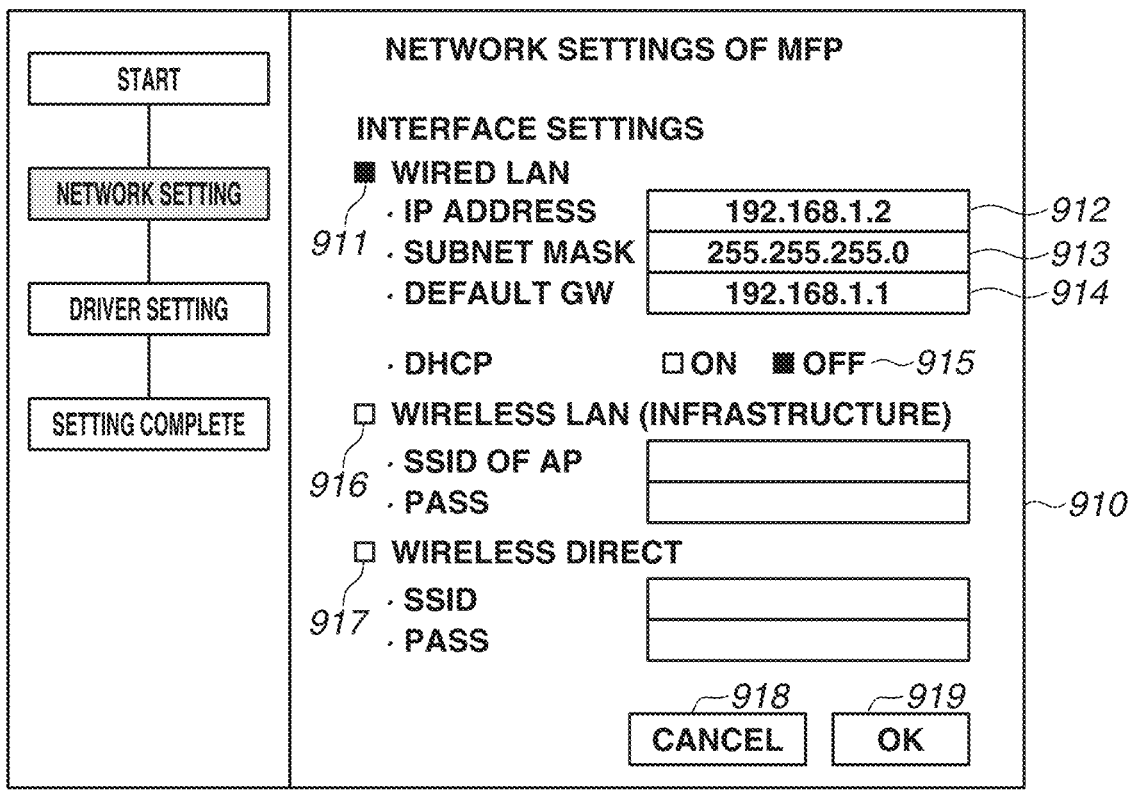

FIG. 9B illustrates an example of a network setting screen 910 of the setup application 403. The network setting screen 910 is a screen to be displayed when the start button 901 is selected, and the network setting of the MFP 101 can be configured on the network setting screen 910. Buttons 911, 916, and 917 on the network setting screen 910 can be used to select a communication function to be enabled in the MFP 101. In the example of FIG. 9B, a wired LAN function is enabled. When the wired LAN function is enabled, a wireless LAN function and a wireless direct function may be configured not to be enabled, or any of the functions may be simultaneously enabled.

An entry field 912 is an entry field for inputting the IP address of the MFP 101 during wired connection. An entry field 913 is an entry field for inputting the subnet mask of the MFP 101 during wired connection. An entry field 914 is an entry field for inputting the default gateway of the MFP 101 during wired connection. A setting button 915 is a button for setting whether to turn on a dynamic host configuration protocol (DHCP) function. In FIG. 9B, the DHCP function is turned off. If the setting button 915 is "ON", setting values input in the entry fields 912 to 914 become invalid and cannot be corrected. When a cancel button 918 is selected, the setup application 403 cancels the network setting. When an OK button 919 is selected, the setup application 403 stores the input setting values in the HDD 210 of the information processing terminal 200, and transmits the setting values input on the network setting screen 910 as network setting information to the MFP 101. In this case, the information processing terminal 200 (setup application 403) may transmit the setting values by universal serial bus (USB) communication or by communication via a wired LAN, a wireless LAN, or the like.

Figure 9C:
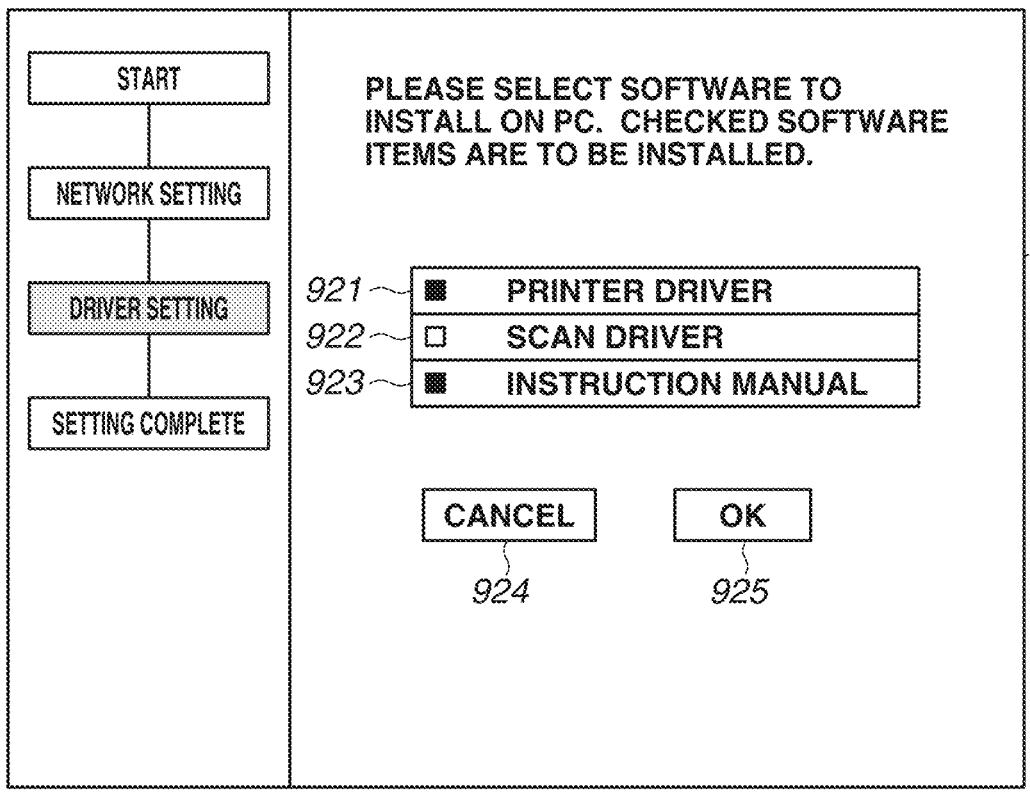
Figure 9D:
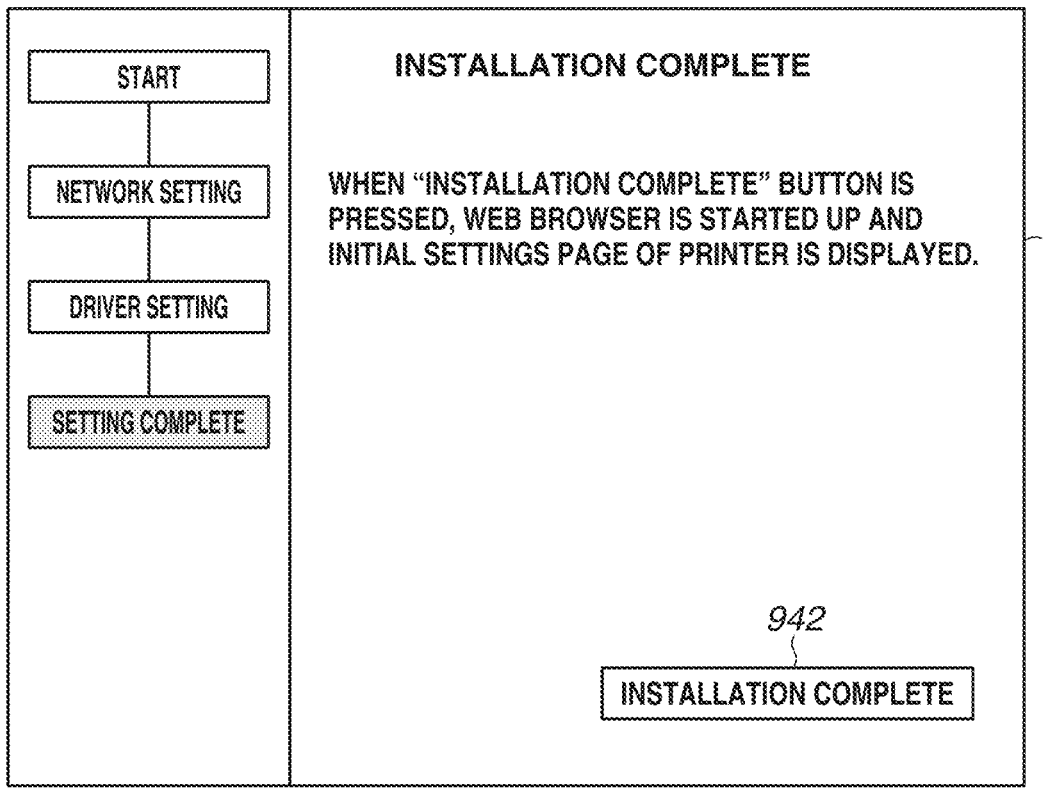

FIG. 9C illustrates an example of a software setting screen 920 of the setup application 403. The software setting screen 920 is a screen to be displayed when the OK button 919 is selected, and is a screen used to select software or the like to be installed on the information processing terminal 200. Buttons 921 to 923 are displayed on the software setting screen 920. The button 921 is a button for installing a printer driver compatible with the MFP 101. The button 922 is a button for installing a scan driver compatible with the MFP 101. The button 923 is a button for downloading an instruction manual for the MFP 101. When an OK button 925 is selected in a state where at least one of the buttons 921 to 923 is selected, software or the like corresponding to the selected button is installed (downloaded) on the information processing terminal 200. When a cancel button 924 is selected, a software setting is canceled.

FIG. 9D illustrates an example of the setting complete screen 940 of the setup application 403. The setting complete screen 940 is displayed when the OK button 925 is selected. A link may be displayed on the setting complete screen 940. When the link is selected, the web browser installed on the information processing terminal 200 is started, and the web browser accesses a URL "http:192.168.1.2/Jinitial_setting.html" that corresponds to the link. The link may be replaced by an object, such as a button. Instead of the user selecting the link, in response to the user selecting the OK button 925, a setup tool may start the web browser installed on the information processing terminal 200 to cause the web browser to access the URL corresponding to the link. A timing when the OK button 919 is selected to complete the reception of the network setting, or a timing when the network setting of the MFP 101 is complete may be used as a trigger for displaying the setting complete screen 940 and a trigger for causing the web browser to access the URL. Whether the network setting of the MFP 101 is complete may be determined based on reception of a network setting completion notification from the MFP 101 by the information processing terminal 200.

FIG. 10 is a diagram illustrating an example of a guideline screen 930 of the setup application 403. The guideline screen 930 includes guide information about a warning displayed on the web browser of the information processing terminal 200 when a web page provided by the web server of the MFP 101 is accessed by HTTPS communication. The guide information includes a guideline image 931, and the guideline image 931 corresponds to the guideline image that is acquired in step S709 or step S710 and indicates a procedure suitable for the browser to be started. A message indicating a method for dealing with the warning, as well as the guideline image 931 may be displayed. Alternatively, only the message indicating the method for dealing with the warning may be displayed instead of the guideline image 931. When the installation complete button 932 is pressed by the user, the setup application 403 starts up the web browser 402 and transmits a URL (address information) for accessing a web page (FIG. 12) for configuring advanced settings of the MFP 101 to the web browser 402. The URL transmitted as described above is identified based on the network setting (IP address etc.) configured by the setup application 403. Then, the setup application 403 ends. In other words, the installation complete button 932 is an object for accessing the web page for configuring advanced settings of the MFP 101 via the web browser of the information processing terminal 200. Thus, when the reception of the network setting is complete, the guide information is displayed on the operation unit 201.

Figure 11:
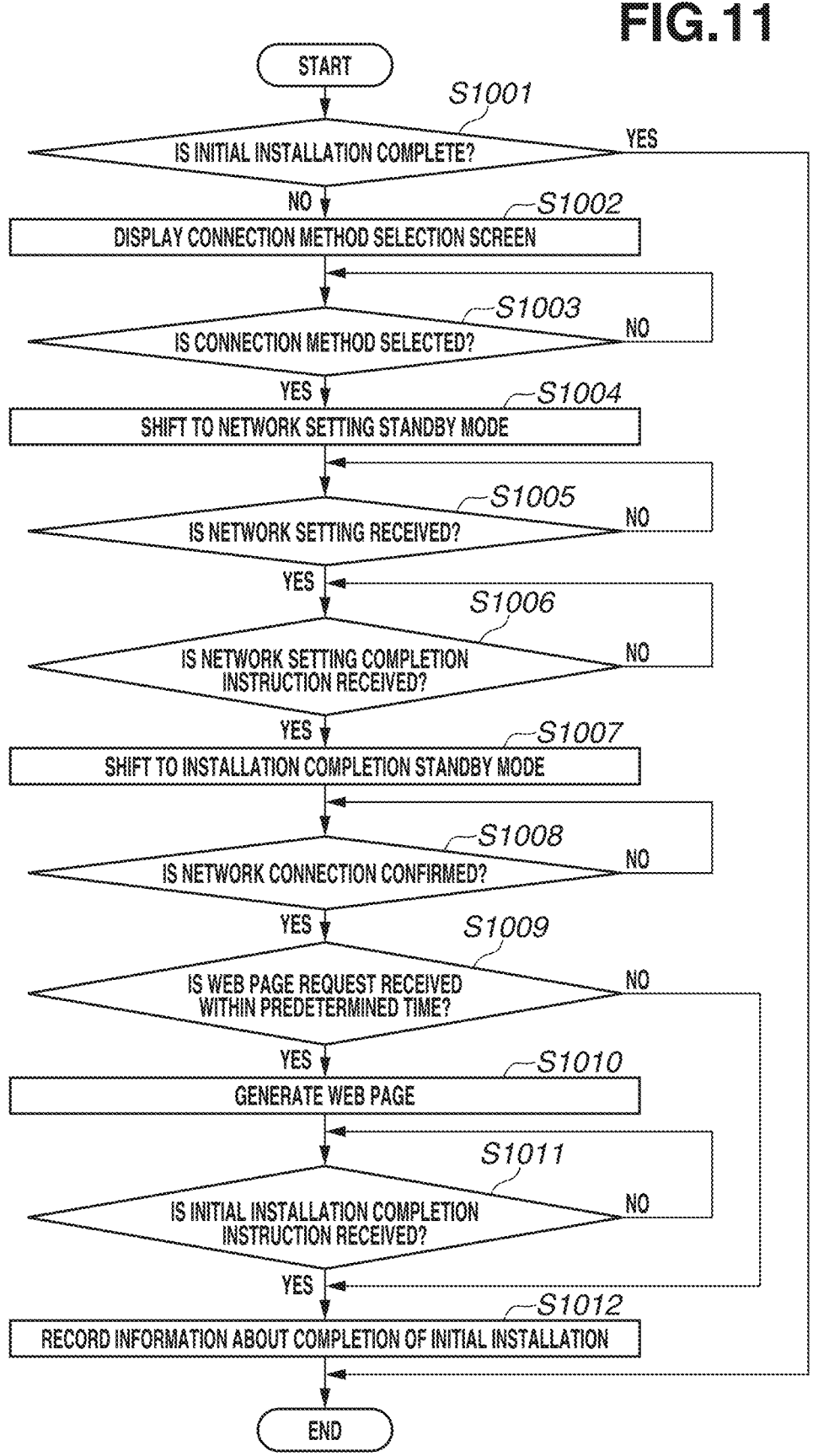
FIG. 11 is a flowchart illustrating an example of processing performed by the MFP in the sequence of FIG. 6.

FIG. 11 is a flowchart illustrating an example of processing performed by the MFP 101 in the sequence of FIG. 6. The CPU 111 loads a program stored in the ROM 112 into the RAM 113, and executes the program to thereby execute the processing in the flowchart of FIG. 11.

In step S1001, the MFP 101 checks information that indicates whether the initial installation is complete and that is stored in the storage 114. If the initial installation is not complete (NO in step S1001), the processing proceeds to step S1002. If the initial installation is complete (YES in step S1001), the processing in this flowchart ends.

In step S1002, the MFP 101 displays a screen for the user to select a connection method on the operation unit 116.

In step S1003, the MFP 101 waits for the user to select the connection method. If the user selects a connection method that requires the network setting (YES in step S1003), the processing proceeds to step S1004. If the user does not select the connection method that requires the network setting (NO in step S1003), the MFP 101 continues to be in the standby state in step S1003.

In step S1004, the MFP 101 shifts to a network setting standby mode. In step S1005, the MFP 101 waits for reception of the network setting. If the network setting is received (YES in step S1005), the processing proceeds to step S1006. If the network setting is not received (NO in step S1005), the MFP 101 continues to be in the network setting standby mode in step S1005.

In step S1006, the MFP 101 waits for reception of the network setting completion notification. If the network setting completion notification is received (YES in step S1006), the processing proceeds to step S1007. If the network setting completion notification is not received (NO in step S1006), the MFP 101 continues to be in the standby state in step S1006.

In step S1007, the MFP 101 shifts to an installation completion standby mode. In step S1008, the MFP 101 waits for confirmation of the network connection. If the network connection is confirmed (YES in step S1008), the MFP 101 transmits a response, and then the processing proceeds to step S1009. If the network connection is not confirmed (NO in step S1008), the MFP 101 continues to be in the standby state in step S1008.

In step S1009, the MFP 101 waits for a web page request. If the web page request is received, the processing proceeds to step S1010. If a predetermined time has elapsed without receiving the web page request, it is automatically determined that the initial installation is complete, and then the processing proceeds to step S1012.

In step S1010, the MFP 101 generates a web page for the initial installation, and transmits the generated web page to the request source.

In step S1011, the MFP 101 waits for an initial installation completion instruction. If the initial installation completion instruction is received (YES in step S1011), the processing proceeds to step S1012. If the initial installation completion instruction is not received (NO in step S1011), the MFP 101 continues to be in the standby state in step S1011. In this case, if a predetermined time has elapsed, it may be determined that the initial installation is complete, and then the processing may proceed to step S1012.

In step S1012, the MFP 101 stores information indicating that the initial installation is complete in the storage 114.

FIG. 12 is a diagram illustrating an example of a web page screen for initial installation provided by the MFP 101 and is displayed on the operation unit 201 of the information processing terminal 200.

An initial setting screen 1101 corresponds to the web page generated in step S1010, and is displayed on the operation unit 201 using the web browser. A title 1102, a fax button 1103, a scan button 1104, a cloud button 1105, and an other button 1106 are displayed on the initial setting screen 1101.

When the fax button 1103 is selected, a web page acquisition request is transmitted from the information processing terminal 200 to the web server of the MFP 101, and a fax setting page is displayed. On the fax setting page, fax transmission and reception settings can be configured.

When the scan button 1104 is selected, a web page acquisition request is transmitted from the information processing terminal 200 to the web server of the MFP 101, and a scan setting page is displayed. On the scan setting page, scan default settings, transmission settings for transmitting image data generated by scanning a document, and the like can be configured. For example, an address of a Simple Mail Transfer Protocol (SMTP) server and an authentication setting can be set.

When the cloud button 1105 is selected, a web page acquisition request is transmitted from the information processing terminal 200 to the web server of the MFP 101, and a cloud setting page is displayed. On the cloud setting page, cloud service authentication information or the like for executing a cloud cooperation function can be set.

When the other button 1106 is selected, a web page acquisition request is transmitted from the information processing terminal 200 to the web server of the MFP 101, and an other setting page is displayed.

Executing the above-described processing enables the user to know in advance how to deal with the warning displayed on the web browser, and also enables the user to know how to access the web page when the warning is displayed.

In the first exemplary embodiment, the example has been described where the setup application 403 displays the guideline image illustrated in FIG. 10. In a second exemplary embodiment, a configuration in which the web browser 402 displays a guideline web page held in the web server 300 will be described.

A caption and a layout on a warning screen on a browser may be changed without notice. To present a more appropriate method for dealing with a warning to the user, it is desirable to display guide information matching the latest caption and layout. If the guide information is displayed on the web browser on which information can be acquired in real time, the guide information matching the latest caption and layout can be easily provided, compared to the case where the guide information is displayed using the setup application 403 installed on the information processing terminal 200. Accordingly, in the present exemplary embodiment, an example where guide information as illustrated in FIG. 10 is displayed on the web browser 402 of the information processing terminal 200 will be described.

Figure 13:
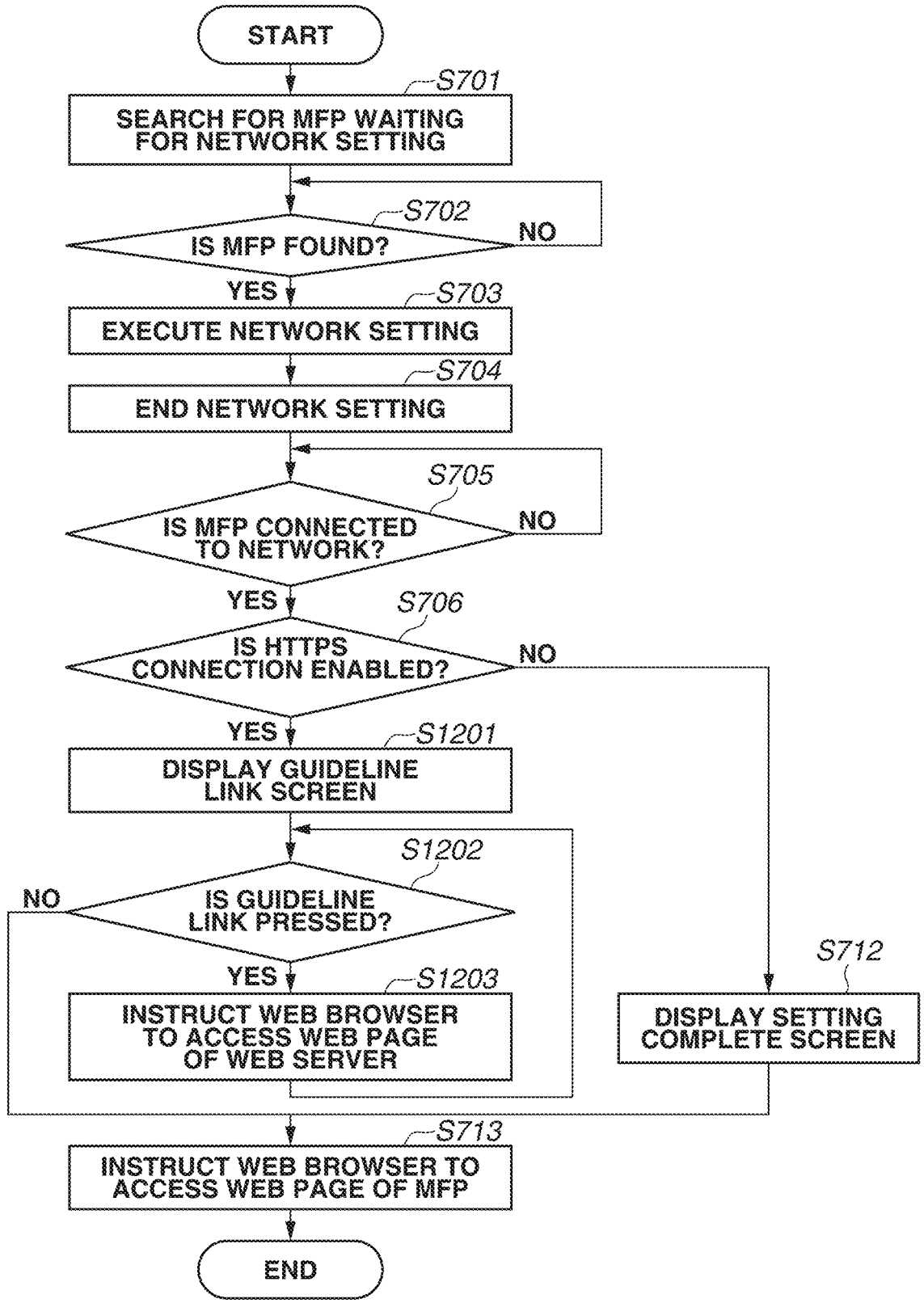
FIG. 13 is a flowchart illustrating an example of processing performed by the setup application to be executed in the information processing terminal.

FIG. 13 is a flowchart illustrating an example of processing performed by the setup application 403 to be executed in the information processing terminal 200. The CPU 207 loads a program stored in the ROM 208 into the RAM 209, and executes the program to thereby execute the processing in the flowchart of FIG. 13.

The processing of steps S701 to S706, S712, and S713 is identical to that in the flowchart of FIG. 7.

Figure 14:
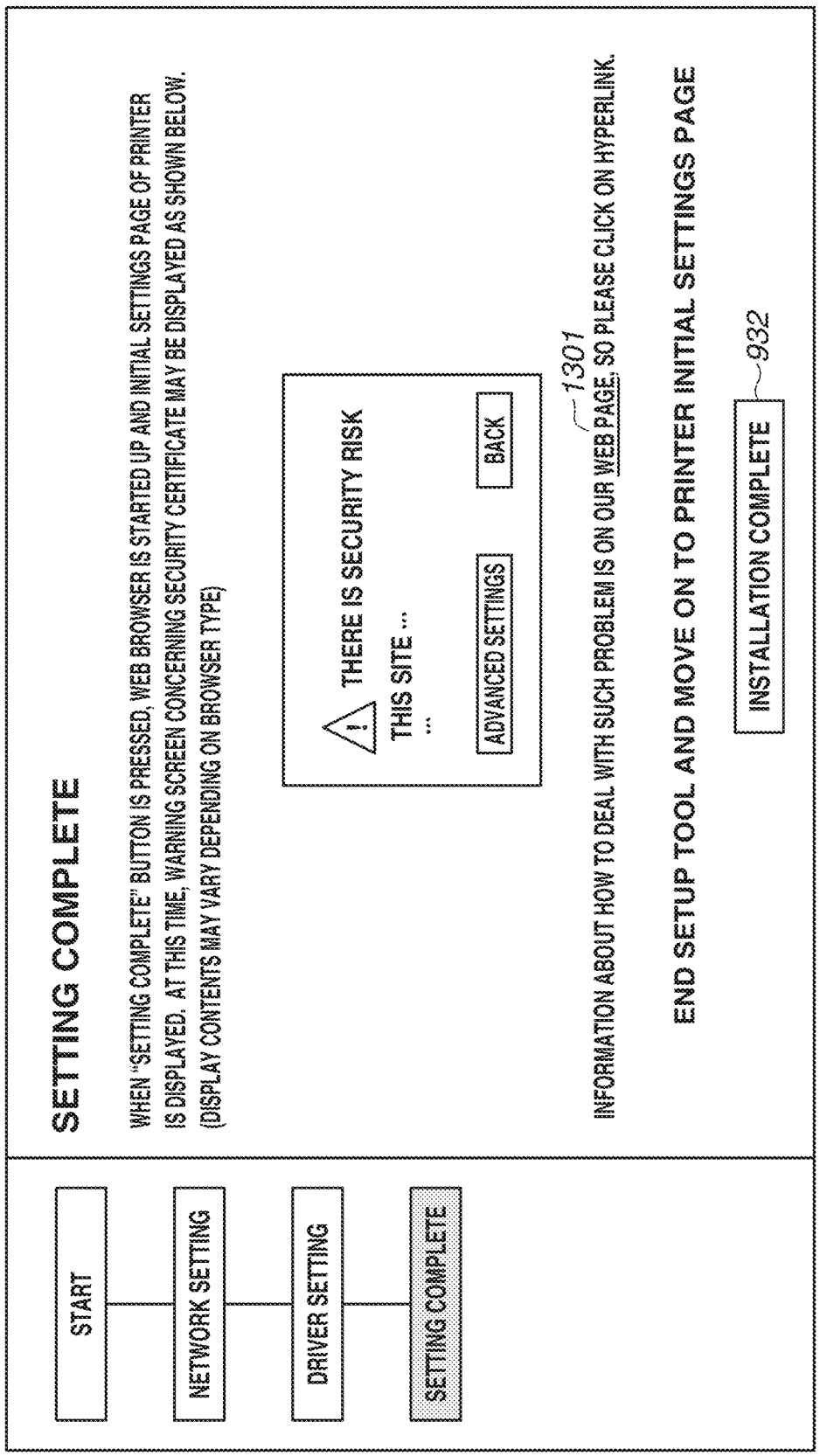
FIG. 14 illustrates an example of a guideline link screen.

In step S1201, the setup application 403 displays a guideline link screen illustrated in FIG. 14. Unlike in the guideline screen 930 illustrated in FIG. 10, images are not switched depending on the default browser on the guideline link screen. Instead of presenting the method for dealing with the warning, a guideline link 1301 to a web page on which the method for dealing with the warning is described is displayed.

In step S1202, the setup application 403 receives a user operation on the guideline link screen. If the guideline link 1301 is pressed (YES in step S1202), the processing proceeds to step S1203. If the installation complete button 932 is pressed (NO in step S1202), the processing proceed to step S713.

In step S1203, the setup application 403 instructs the web browser 402 to access the web page of the web server 300 via the OS 401. A URL of the web page is preliminarily stored in the HDD 210 and is fixed. The web browser 402 that has received the instruction displays a guideline web page (not illustrated). The guideline web page includes information similar to the guideline image 931 illustrated in FIG. 10. The web page to be displayed in this case is displayed in accordance with the browser started up on the information processing terminal 200. Specifically, the setup application 403 acquires information about the default browser of the information processing terminal 200 from the OS 401, and switches the URL to be acquired from the HDD 210 based on the information about the browser. Alternatively, the URL may be fixed regardless of the type of browser, the information about the browser may be transmitted to the web server 300, and the web page to be displayed in accordance with the browser may be switched by the web server 300. The screen of the setup application 403 does not transition to any other screen, and thus the processing returns to step S1202 to wait for a user operation.

In the second exemplary embodiment, the user presses the guideline link 1301 on the guideline link screen to thereby start up the web browser 402 and display the guideline web page.

In a third exemplary embodiment, a configuration for automatically starting up the web browser 402 to display a guideline web page depending on a HTTPS connection enabled/disabled setting of the MFP 101 at the end of the setup application 403 will be described.

Figure 15:
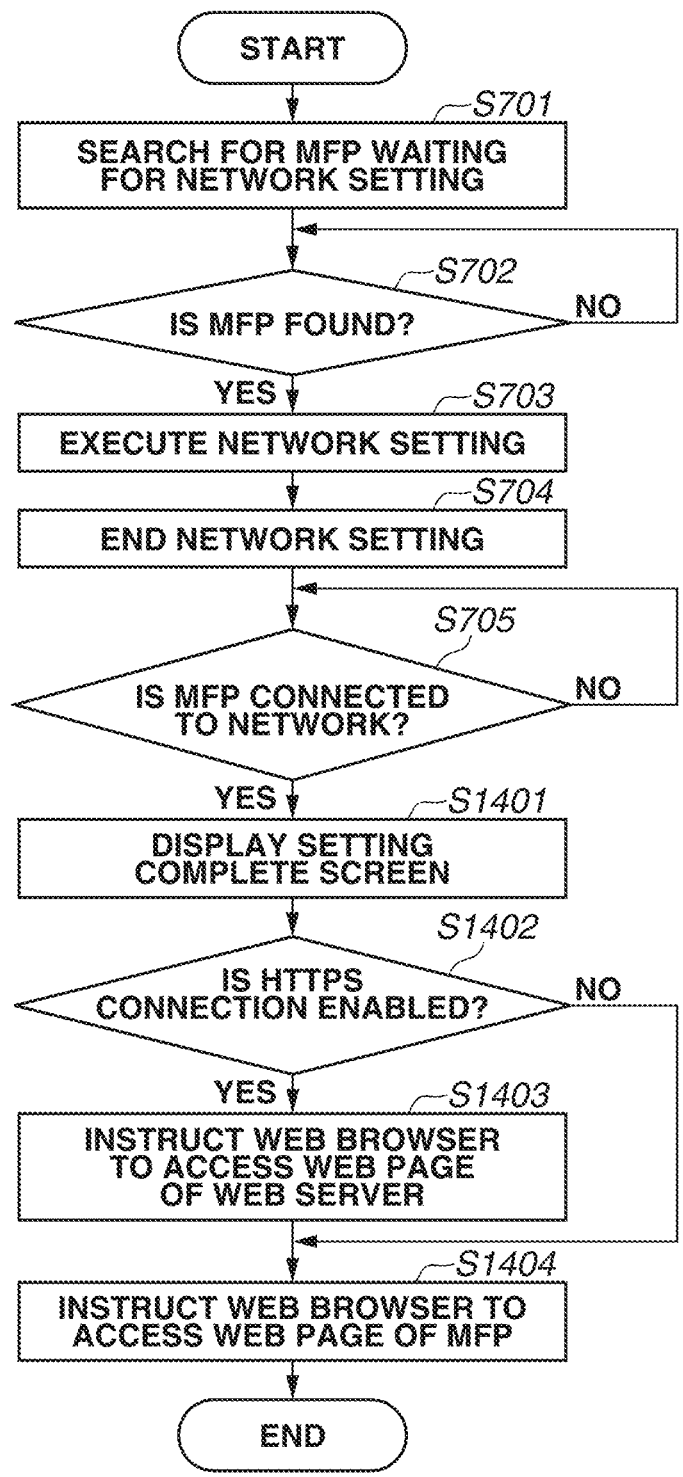
FIG. 15 is a flowchart illustrating an example of processing performed by the setup application to be executed in the information processing terminal.

FIG. 15 is a flowchart illustrating an example of processing performed by the setup application 403 to be executed in the information processing terminal 200. The CPU 207 loads a program stored in the ROM 208 into the RAM 209, and executes the program to thereby execute the processing in the flowchart of FIG. 15.

The processing of steps S701 to S705 is identical to that in the flowchart of FIG. 7. In step S1401, the setup application 403 displays the setting complete screen 940 described above. When the user presses the installation complete button 942, the processing proceeds to step S1402.

In step S1402, the setup application 403 determines whether HTTPS connection of the MFP 101 is enabled, as in step S706. If the HTTPS connection is enabled (YES in step S1402), the processing proceeds to step S1403. If the HTTPS connection is not enabled (NO in step S1402), the processing proceeds to step S1404.

In step S1403, the setup application 403 instructs the web browser 402 to access a web page of the web server 300, as in step S1203. After that, the processing automatically proceeds to step S1404.

In step S1404, the setup application 403 instructs the web browser 402 to access a web page of the MFP 101 via the OS 401, as in step S713. In general, a plurality of web pages can be simultaneously opened on a web browser. Accordingly, the guideline web page and the warning screen on the web page of the MFP 101 are simultaneously opened. This enables the user to deal with the warning screen while viewing the guideline web page. If the processing directly proceeds to step S1404 from step S1402, only the web page of the MFP 101 is opened. In the present exemplary embodiment, an effect of reducing time and labor for the user to press a guideline link can be obtained in addition to the effect in the second exemplary embodiment.

In the first to third exemplary embodiments, configuration examples during the initial installation of the MFP 101 have mainly been described. In another case, the HTTPS connection can be enabled during use while the HTTPS connection is disabled during the initial installation. In this case, the user can establish the HTTP connection as before. A fourth exemplary embodiment illustrates a configuration example in which a guideline link screen is displayed in such a case. In this configuration, the guideline link screen is displayed on the web page of the MFP 101.

Figure 16:
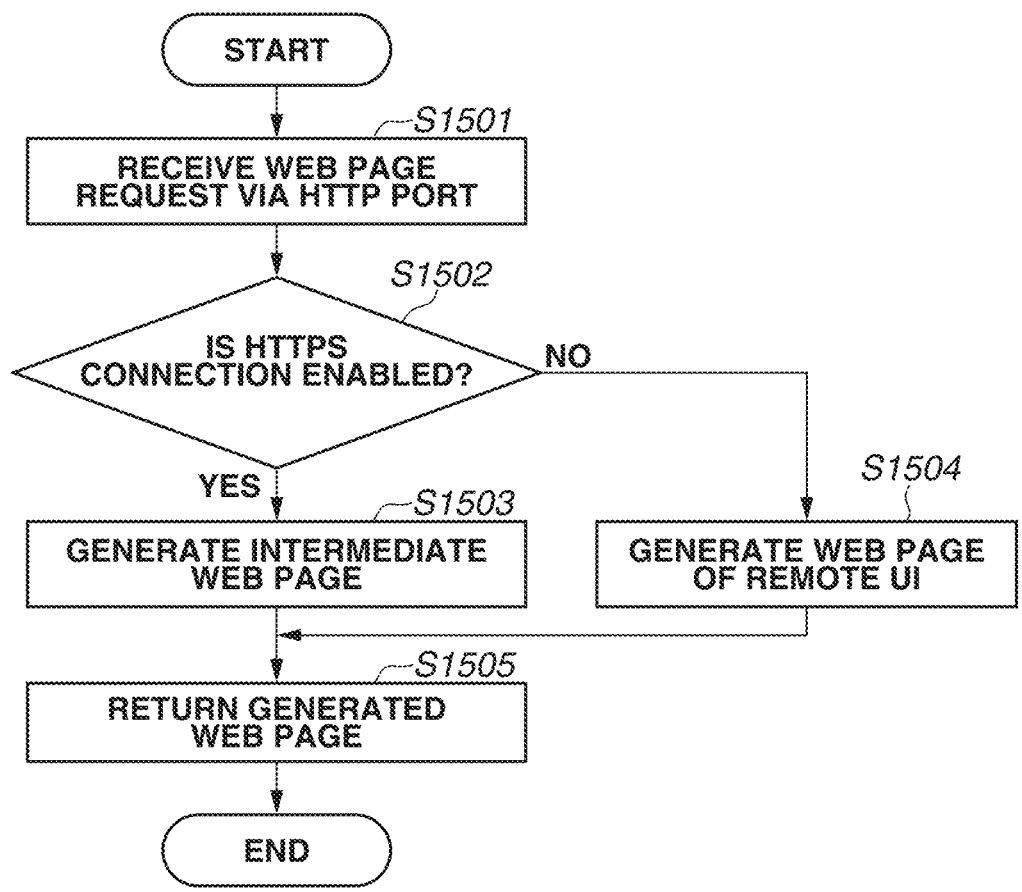
FIG. 16 is a flowchart illustrating an example of processing performed by the MFP.

FIG. 16 is a flowchart illustrating an example of processing performed by the MFP 101. The CPU 111 loads a program stored in the ROM 112 into the RAM 113, and executes the program to thereby execute the processing in the flowchart of FIG. 16.

In step S1501, the MFP 101 receives a web page request from the information processing terminal 200 via an HTTP port.

In step S1502, the MFP 101 determines whether the HTTPS connection is enabled based on the network setting of the MFP 101. If the HTTPS connection is enabled (YES in step S1502), the processing proceeds to step S1503. If the HTTPS connection is not enabled (NO in step S1502), the processing proceeds to step S1504.

Figure 17:
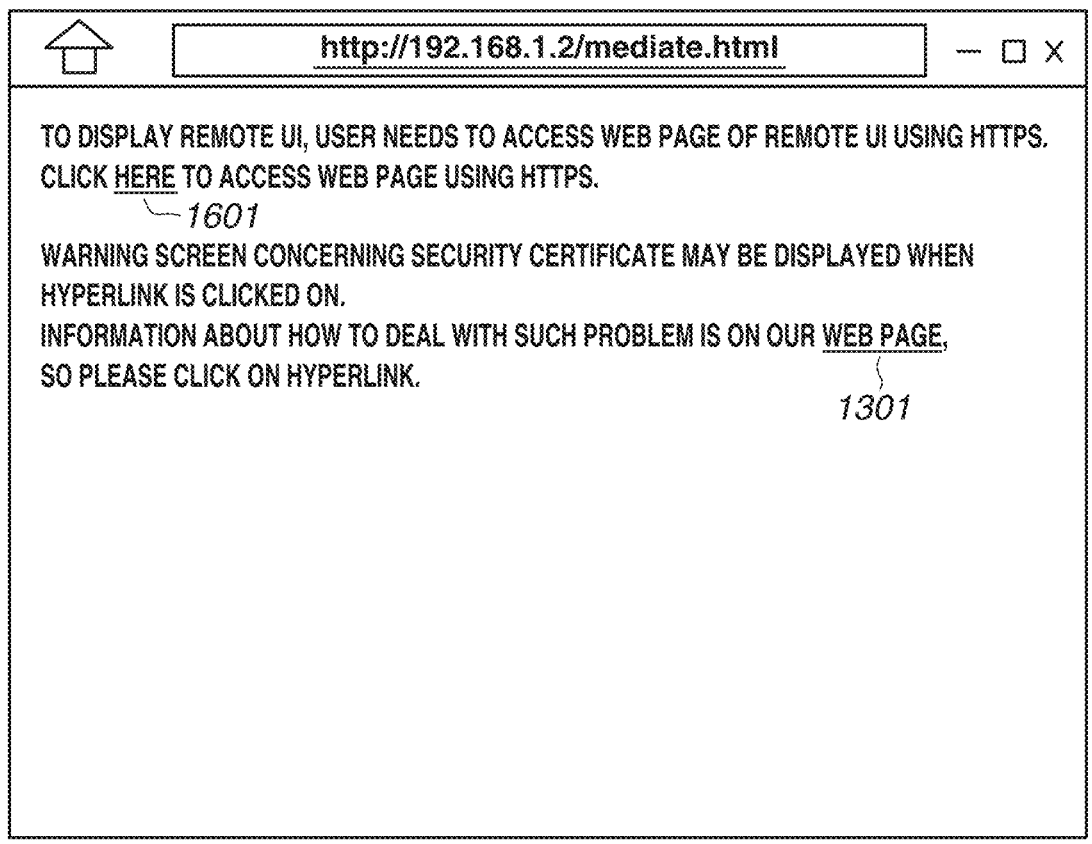
FIG. 17 is a diagram illustrating an example of an intermediate web page.

In step S1503, the MFP 101 generates an intermediate web page illustrated in FIG. 17. An HTTPS link 1601 is a link for establishing the HTTPS connection to the MFP 101.

Specifically, the HTTPS link 1601 is a URL whose scheme is HTTPS and domain name is composed of the IP address of the MFP 101. The guideline link 1301 is identical to that described above with reference to FIG. 14.

The MFP 101 preliminarily stores the URL of the web page of the web server 300 in a storage medium, such as the ROM 112 or the storage 114.

In step S1504, the MFP 101 generates a web page of a remote user interface (UI) (not illustrated) because the HTTPS connection is disabled.

In step S1505, the MFP 101 returns the web page generated in step S1503 or step S1504 to the information processing terminal 200.

The present exemplary embodiment provides the user with the same effect as that of the first exemplary embodiment even in the case where the HTTPS connection is enabled during use and not during the initial installation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-004841, filed Jan. 17, 2023, which is hereby incorporated by reference herein in its entirety.

What is claimed is:

1. A non-transitory computer-readable storage medium storing a program for causing a terminal apparatus to communicate with an information processing apparatus to execute a method comprising:
   receiving a first setting of the information processing apparatus; and
   displaying an object for accessing a web page for configuring a second setting of the information processing apparatus via a web browser,
   wherein, in the displaying, guide information about a warning displayed by operating the object for accessing the web page is displayed.

2. The non-transitory computer-readable storage medium according to claim 1, wherein, in the displaying, the guide information is displayed upon completion of the receiving of the first setting.

3. The non-transitory computer-readable storage medium according to claim 1, wherein the program causes the terminal apparatus to execute the method further comprising transmitting address information for accessing the web page to the web browser upon selection of the displayed object by a user.

4. The non-transitory computer-readable storage medium according to claim 3, wherein the program causes the terminal apparatus to execute the method further comprising identifying the transmitted address information based on the first setting.

5. The non-transitory computer-readable storage medium according to claim 1, wherein in the displaying, the guide information and the object are displayed on a same screen.

6. The non-transitory computer-readable storage medium according to claim 1, wherein the first setting is a network setting of the information processing apparatus.

7. The non-transitory computer-readable storage medium according to claim 1, wherein the displayed guide information includes an image based on the warning and a message indicating a method for dealing with the warning.

8. The non-transitory computer-readable storage medium according to claim 1, wherein the web page is provided by a web server of the information processing apparatus.

9. The non-transitory computer-readable storage medium according to claim 8, wherein the warning is a warning concerning a certificate held in the web server.

10. The non-transitory computer-readable storage medium according to claim 1, wherein the second setting is a scan setting of the information processing apparatus.

11. The non-transitory computer-readable storage medium according to claim 7, wherein the displayed guide information is determined based on a default web browser of the terminal apparatus.

12. A control method for a terminal apparatus to communicate with an information processing apparatus, the control method comprising:
   receiving a first setting of the information processing apparatus; and
   displaying an object for accessing a web page for configuring a second setting of the information processing apparatus via a web browser,
   wherein, in the displaying, guide information about a warning displayed by operating the object for accessing the web page is displayed.

13. A terminal apparatus configured to communicate with an information processing apparatus, the terminal apparatus comprising:
   one or more controllers including one or more processors and one or more memories, the one or more controllers configured to:
   receive a first setting of the information processing apparatus; and
   display an object for accessing a web page for configuring a second setting of the information processing apparatus via a web browser,
   wherein guide information about a warning displayed by operating the object for accessing the web page is displayed.

* * * * *